United States Patent [19]

Walworth, Jr. et al.

[11] Patent Number: 5,188,418
[45] Date of Patent: Feb. 23, 1993

[54] TRUCK BED AND METHOD OF MANUFACTURE

[75] Inventors: Tom M. Walworth, Jr., Grosse Pointe Farms; Joseph J. Jurica, Mt. Clemens; Donald E. Weilemann, Romeo; Joseph Turner, Bloomingdale, all of Mich.

[73] Assignee: Pullman Industries, Inc., Pullman, Mich.

[21] Appl. No.: 864,741

[22] Filed: Apr. 7, 1992

[51] Int. Cl.$^5$ ............................................. B62D 25/20
[52] U.S. Cl. ................................. 296/183; 296/182; 296/191; 296/204; 52/478; 52/537; 52/630; 52/797
[58] Field of Search ............... 296/183, 182, 204, 191, 296/204, 39.2; 52/797, 630, 537, 478

[56] References Cited

U.S. PATENT DOCUMENTS

| | | | |
|---|---|---|---|
| 2,853,330 | 9/1958 | Harry | 52/478 |
| 3,253,375 | 5/1966 | Takehara | 52/478 |
| 3,310,925 | 3/1967 | LeBrun | 52/630 |
| 4,188,058 | 2/1980 | Resa et al. | 296/39.2 |
| 4,631,891 | 12/1986 | Donavich | 296/204 |
| 4,914,886 | 4/1990 | Ericksson et al. | 52/537 |
| 5,137,322 | 8/1992 | Murihead | 296/39.1 |

*Primary Examiner*—Robert R. Song
*Attorney, Agent, or Firm*—Flynn, Thiel, Boutell & Tanis

[57] ABSTRACT

An improved vehicle bed assembly, and process of manufacture, which involves formation of the floor pan by roll forming, with the floor pan having strengthening ribs extending longitudinally throughout the entire length of the floor pan so as to terminate at the front and rear free edges thereof. The rear free edge of the floor pan cooperates with a rear sill member which has rib-end defining projections formed thereon and cooperating with the ends of the ribs on the floor pan for closing off said ribs and creating a transition to a flat horizontal surface defined on the rear sill member. The rib ends of the rear sill member preferably have guide portions which nest into and are fixedly secured, as by spot welding, to the rearward ends of the ribs defined on the floor pan.

20 Claims, 4 Drawing Sheets

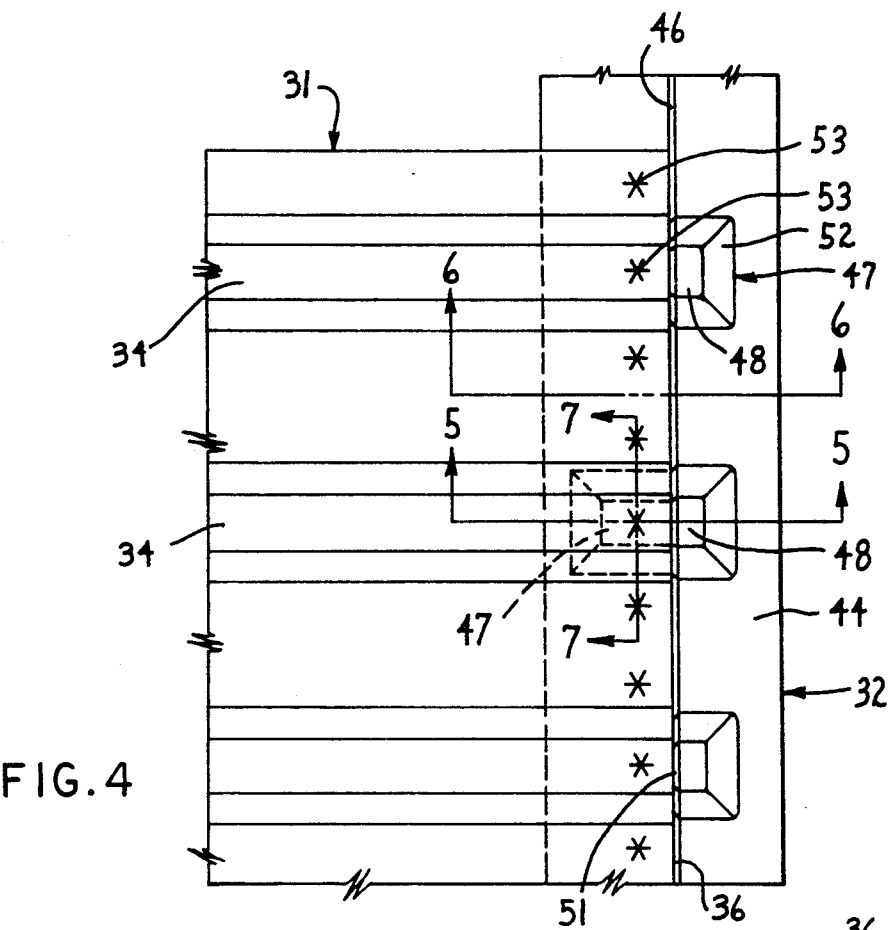
FIG. 4
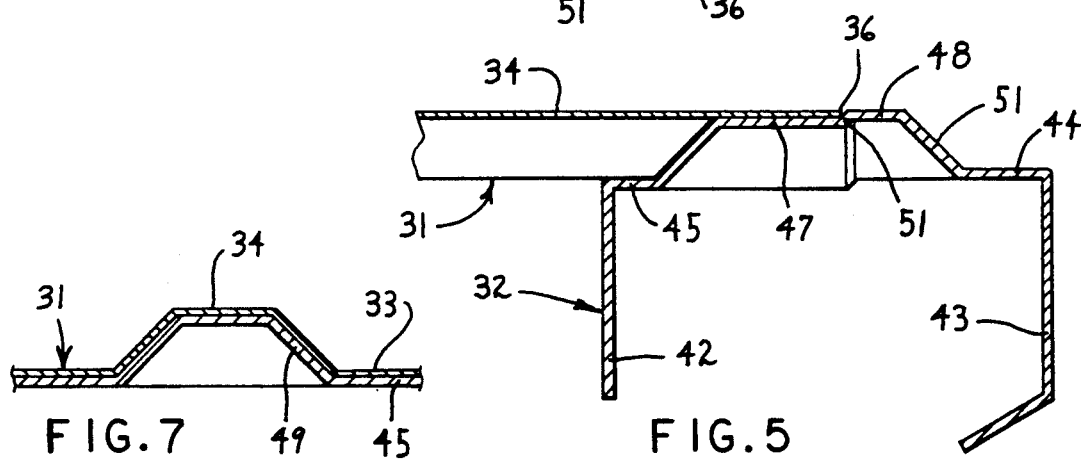
FIG. 7
FIG. 5
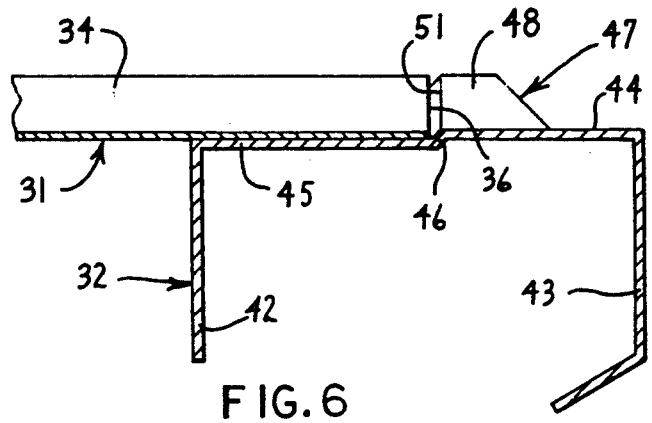
FIG. 6

TRUCK BED AND METHOD OF MANUFACTURE

FIELD OF THE INVENTION

This inventions relates to the construction of a truck bed, such as a pickup truck bed, and in particular relates to an improved construction of the bed floor and rear sill, and an improved constructional method.

BACKGROUND OF THE INVENTION

A box of a truck, such as a pickup truck, is illustrated in FIG. 1. This box 11 conventionally includes a horizontally enlarged floor or bed assembly 12 which extends sidewardly between and is joined to generally parallel and upwardly extending side panels or walls 13. The side panels 13 conventionally have wheelwell housings 14 formed therein, the latter typically projecting at least inwardly a small extent into the interior of the box. The front end of the floor assembly 12 is also rigidly joined to an upwardly projecting front wall or panel 15, the latter extending between and being rigidly fixed to the side panels 13. The rear of the box is normally closed by a rear panel 16, the latter conventionally being an openable tailgate 16 which is conventionally hingedly joined to the box and can swing into an open generally horizontal position wherein it is substantially flush with the floor assembly to provide access to the interior of the box.

This box 11, and specifically the floor or bed assembly 12, conventionally includes a horizontally enlarged main bed member 17, commonly referred to as the floor pan, which defines the actual floor of the box and extends lengthwise between the front and rear ends of the box, and has a width which normally substantially spans the width of the opening between the wheelwell housings. This main floor pan 17 is supported on a front cross rail 18, several intermediate cross rails 19, and a rear cross rail or sill member 21, the latter all extending transversely under the pan and being fixedly secured thereto, such as by spot welding. Some of these cross members, such as the front rail 18, the frontmost intermediate rail 19 and the rear sill 21 are typically fixedly secured to the vehicle frame (not shown) in a conventional manner.

The bed assembly 12 also normally includes secondary bed or floor pan members 22, the latter being positioned adjacent and fixedly joined to opposite longitudinal edges of the main floor pan 17 so as to occupy the regions of the bed disposed forwardly and rearwardly of the wheelwell housings 14.

In the pickup box 11 as conventionally constructed, the main floor pan 17 is provided with stiffening ribs 23 which project upwardly from the pan, with a plurality of such ribs being generally uniformly sidewardly spaced apart across the width of the pan and extending longitudinally of the pan over a majority of the length thereof. These ribs, which are deformed upwardly from the pan to define a downwardly-opening channel-like cross section, generally extend rearwardly from the front free edge of the main pan 17 but the ribs normally terminate in tapered rib ends 24 which merge downwardly into the planar profile of the pan 17 at a location disposed close to but spaced forwardly a small distance from the rear free edge 25 of the pan. The rear edge portion of the main pan 17, namely the flat portion thereof which is free of the ribs, is then normally seated within a shallow recess formed in the top wall of the rear sill member 21 so as to be substantially flush with the upper surface of the sill member, with the rear pan and sill member then being suitably fixedly secured together, such as by spot welding. This arrangement enables the groovelike regions defined between adjacent ribs 23 to freely open outwardly through the rear end of the bed assembly, and hence prevent creation of pockets or recesses which would collect dirt or moisture.

A bed assembly having the structure described above has, for a very long time, been constructed using individual members which have been stamped utilizing large forming presses. That is, the main floor pan 17 as well as the cross rails 18, 19 and 21 have been conventionally formed from flat steel sheets by positioning a precut steel sheet in a forming press which deforms the sheet to define the desired cross section of the finished member. This stamping or press-forming technique, however, even though extensively utilized for many years, possesses recognized disadvantages which have nevertheless been long tolerated in view of the belief that this was the best manner of constructing the bed assembly.

More specifically, and particularly with respect to the main floor pan 17, the current and almost universally utilized technique of stamping the pan has resulted in limitations which have restricted optimum construction of the pan. For example, to stamp the main floor pan 17, a large rectangular sheet must be precut in accordance with the size of the desired pan being stamped. The sheet is initially of excess width so as to provide portions along opposite edges of the sheet which can be used for clamping the sheet and holding it in position when the sheet is positioned within the press and subjected to the stamping operation. Further, during the actual stamping operation, the material of the sheet is physically deformed by the stamping die so as to permit creation of the longitudinal ribs. This necessarily results in significant changes in thickness of the sheet material due to the deformation which is caused during the rib formation process. Not only does the sheet undergo significant changes in thickness, but this change in thickness is also of varying amounts at different locations across the rib, or through the cross section of the sheet containing the ribs, so that the resulting stamped floor pan has a sheet thickness which has significant variation therein. This thickness variation can in some instances be as much as 40% to 50%. This stamping process has also been observed to result in bends or corners which are inconsistent in terms of both material thickness and included angle, and have provided a finished exterior appearance which permits such irregularities to be visually observed. This stamping operation also requires, after the pan has been stamped, that the pan be subjected to a further stamping or cutting operation which is effective for removing the clamping strip portions on opposite sides of the sheet, which strip portions are disposed of as scrap.

In view of the inherent but inconsistent thickness reductions which occur during forming of the pan by the stamping or pressing process, the pan must also be initially formed from a sheet material of greater thickness than desired so as to compensate for the expected thickness reductions which occur during the stamping operation. This increases the overall weight of the pan. Further, in view of the significant size of the main floor pan and the fact that it is deformed or stamped in basically a single pressing operation, this also necessitates utilization of an extremely large and high-capacity forming press in order to accommodate both the size of the sheet and the significant pressing force encountered during the simultaneous deformation of the numerous ribs which extend longitudinally thereof. Further, these restamping operations necessarily can normally be successfully carried out only if lower strength and softer sheet steels are utilized since harder and higher strength steels will typically split or crack if subjected to severe deformation of the type encountered in the conventional pan stamping operation.

Accordingly, it is an object of this invention to provide an improved truck bed assembly, and a method of manufacturing and assembling the primary components of the truck bed assembly, so as to overcome many of the disadvantages associated with the conventional and long-utilized stamped bed assembly as described above.

More specifically, the present invention relates to an improved truck bed assembly, and process of manufacture, which involves formation of the floor pan by roll forming, with the floor pan having the strengthening ribs thereof extending longitudinally throughout the entire length of the floor pan so as to terminate at the front and rear edges thereof, with the rear edge of the floor pan cooperating with a rear sill member which is also preferably roll formed and has rib ends formed thereon and cooperating with the ends of the ribs on the main floor pan for closing off said ribs and creating a transition to a flat horizontal surface defined on the rear sill member. The rib ends on the rear sill member also preferably have portions which nest into and are fixedly secured to, as by spot welding, the rearward ends of the ribs defined on the main floor pan.

With the improved truck bed assembly and construction method of the present invention, as briefly summarized above, numerous constructional advantages are achieved in relationship to the conventional construction. More specifically, roll forming of the main floor pan permits utilization of higher strength sheet steel than is typically usable with stamping; roll forming permits the thickness of the formed pan to be substantially uniformly maintained throughout the entire cross section, thus eliminating the highly undesirable thickness variations created in the conventional stamping process, and hence enabling the pan to be formed from sheet steel of significantly smaller thickness, which reduction in thickness may be in the order of 30% to 40%; roll forming of the main floor pan permits creation of sharper corners or curvatures than is typically possible using a stamping operation; roll forming the main floor pan permits significantly higher consistency and uniformity in the rib structures including the corners than is possible using a stamping operation; roll forming of the pan provides better strength characteristics in the resultant product, and minimizes the creation of numerous high stress concentrations such as exists at the corners when the pan is stamped; roll forming of the pan enables the finished pan to be formed from sheet material which is originally of less width and in fact permits the pan to be formed from sheet material of a width which is all substantially used in forming the pan, whereas in contrast the stamping operation requires significantly wide edge portions which are clamped during the stamping operation and are then cut off and disposed of as scrap, such scrap edge portions not be necessary when the pan is roll formed; roll forming enables formation of the entire pan cross section including not only the strengthening ribs but also the securing flanges which project downwardly along opposite longitudinal edges of the main pan, whereas in contrast the stamped pan typically requires that the side flanges be formed separate from the main stamping operation, and in fact the stamping operation also often requires a restamping of the entire part so as to compensate for the spring back of the part created by the initial stamping operation; and roll forming of the pan and the ability to use thinner steel sheet and higher strength steel permits the overall weight of the pan assembly to be significantly reduced, such as by up to about 35%, thereby enabling reduction in the overall vehicle weight and hence improvement in fuel economy.

The present invention, in addition to the improvements and advantages briefly summarized above, is also believed to provide significant cost savings with respect to the overall manufacturing process, and permits creation of cross sections or shapes in the bed which is not possible with a stamping operation, including the creation of sharper corners having a higher consistency with respect to both curvature and thickness of bends.

Other objects and purposes of the invention will be apparent to persons familiar with structures and processes of this general type upon reading the following specification and inspecting the accompanying drawings.

BRIEF DESCRIPTION OF THE DRAWINGS

FIG. 4 is a fragmentary top view which illustrates the structural connection of the main floor pan to the rear sill member.

FIGS. 5, 6 and 7 are enlarged, fragmentary sectional views respectively taken along lines 5—5, 6—6 and 7—7 in FIG. 4.

Figure 1:
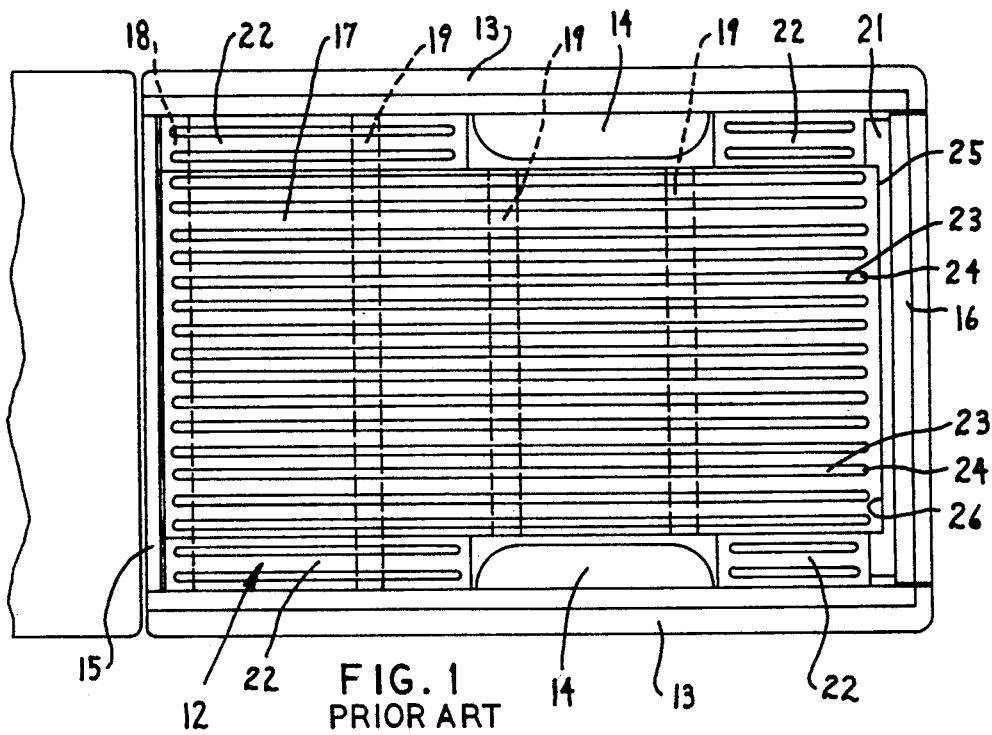
FIG. 1 is a top plan view of a conventional pickup truck box which illustrates a well known construction of the bed assembly.
Figure 2:
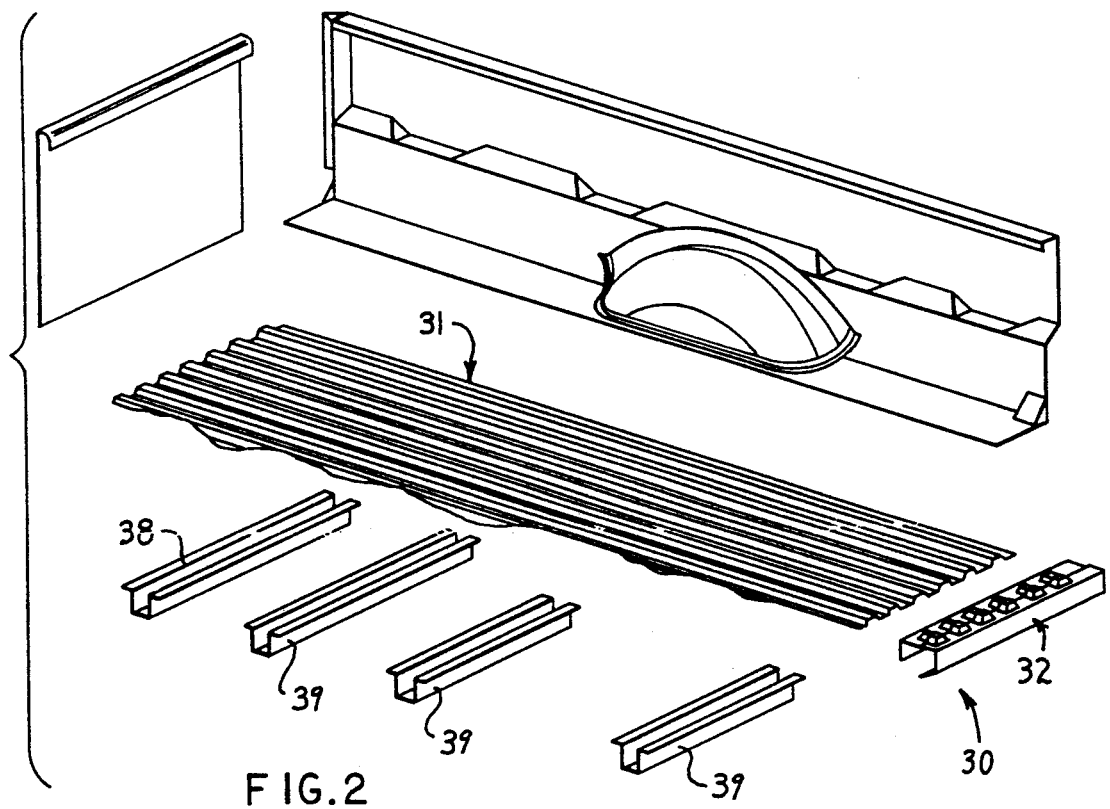
FIG. 2 is an exploded perspective view illustrating the basic components which comprise the improved bed assembly of this invention.

Certain terminology will be used in the following description for convenience in reference only, and will not be limiting. For example, the words "upwardly", "downwardly", "rightwardly" and "leftwardly" will refer to directions in the drawings to which reference is made. The word "upwardly" will also be used in reference to an exposed top surface of the floor pan of the bed assembly. The words "inwardly" and "outwardly" will refer to directions toward and away from, respectively, the geometric center of the box or bed assembly, or designated parts thereof. Said terminology will include the words specifically mentioned, derivatives thereof, and words of similar import.

DETAILED DESCRIPTION

The present invention will now be described, particularly with reference to the structure shown by FIGS. 2-7. The floor or bed assembly 30 according to the present invention employs a main bed or floor pan 31 which cooperates with and has the rear edge thereof supported on a rear cross or sill member 32. The main pan 31 is also supported on a front cross rail 38 and several (three in the illustrated embodiment) intermediate cross rails 39.

The main floor pan 31 is formed (preferably roll formed as described hereinafter) from a thin sheet 33 of steel, preferably high strength steel having a thickness of about 0.8 mm, so that the main pan 31 is of an integral and monolithic one-piece construction with the pan having substantially uniform thickness throughout the transverse cross sectional extend thereof. The main pan 31, due to the deforming of the thin sheet 33, has a plurality of longitudinally-elongate stiffening ribs 34 projecting upwardly from the plane of the plate 33. These ribs 34 are generally uniformly sidewardly spaced apart in the transverse or widthwise direction of the pan 31, with the ribs 34 extending longitudinally of the pan in generally parallel relationship. The ribs 34 have a generally inverted channel-like or U-shaped cross section, whereby each adjacent pair of ribs define an elongate valley therebetween as defined by the original planar plate 33. The ribs 34 project longitudinally throughout the entire length of the floor pan 31 so as to terminate at the respective front and rear free edges 35 and 36 of the plate 33. These ribs result in the main floor pan having a substantially uniform transverse corrugated cross section throughout the entire longitudinal length thereof.

The main floor pan 31 also has an edge flange 37 extending longitudinally along each side edge and projecting downwardly, which edge flange 37 is integrally joined to and is bent downwardly from the main plate 33. This edge flange 37 is provided so as to permit securement, such as by spot welding, to a similar adjacent edge flange formed on the secondary bed members 22 (FIG. 1). This edge flange 37 is also provided with cutouts or notches (not shown) to accommodate therein the front cross rail 38, the frontmost intermediate rail 39 and the rear sill 32. This flange 37 projects downwardly directly adjacent the remaining two intermediate cross rails 39 which are of shorter length and positioned generally between the wheelwell housings.

The rear cross or sill member 32 is defined by a one-piece channel-like member 41 which is of a generally downwardly-opening channel- or U-shaped cross section. This channel-like member 41 is of a length so as to extend transversely across the entire rear edge of the truck bed and terminates adjacent the opposite side panels of the truck box.

The channel-like member 41 defining the rear sill 32 includes downwardly projecting front and rear sidewalls 42 and 43, respectively, the latter terminating in lower free edges which are significantly spaced apart so as to define an open mouth which extends longitudinally of the member to hence provide upward accessibility into the interior of the channel-like member. The sidewalls 42 and 43 are rigidly joined together by a top wall which includes rear and front top wall portions 44 and 45, respectively. The top wall portions 44 and 45 are both generally horizontally planar walls, and the front top wall portion 45 is vertically offset downwardly a small distance from the rear top wall portion 44, whereby a forwardly-facing shoulder 46 is defined at the offset between the wall portions 44 and 45. The top wall as defined by portions 44-45 defines a generally shallow Z-shaped transverse cross section.

The offset top wall portions 44-45, and the shoulder 46 defined therebetween, extend longitudinally throughout the entire length of the rear sill member 32, and the sill member is preferably roll formed to permit formation of the desired channel-like cross section.

The vertical offset between upper surfaces of the wall portions 44-45 preferably substantially equals the thickness of the main plate 33 so that, when the rear portion of the main plate 33 is supportingly engaged on the front top wall portion 45, the upper surfaces of the valleys in the main plate 33 will be substantially coplanar with the upper surface of the rear top wall portion 44.

The rear sill member 32 also has a plurality of rib-end projections 47 fixed to and projecting upwardly from the top wall 44-45 of the channel member 41. The plurality of rib-end projections 47 are disposed in uniformly spaced relationship along a row which extends generally longitudinally of the rear sill member, with the number of and spacing between the rib-end projections 47 corresponding to the number of and sideward spacing between the strengthening ribs 34 provided on the main pan 31.

Each rib-end projection 47, as illustrated by FIGS. 3-7, includes a rear part 48 which projects upwardly from the rear top wall portion 44, and a front part 49 which projects upwardly from the front top wall portion 45. The rear and front parts 48 and 49 define a forwardly-facing shoulder 51 therebetween, which shoulder in effect constitutes an extension of the shoulder 46.

The rear projection part 48 functions as a rib-end, and in the vicinity of the shoulder 51 has an exterior cross section (i.e., upper or outer exposed surface) which corresponds to the exterior surface defined on the rib 34 at the rear free edge 36. This rear rib part 48, however, at and more preferably slightly rearwardly from the shoulder 51, is provided with an end wall 52 which joins to the top of the rib and then slopes downwardly as it projects rearwardly for merger with the upper surface of the rear top wall portion 44.

The front part 49 of the rib-end projection 47 functions as a supportive guide, and is adapted to telescopically nest within the rearward end of the respectively adjacent rib 34 as defined on the main floor pan 31. For this purpose, the front part 49 has an exterior cross section (that is, an outer wall) which has a size and configuration which substantially corresponds to the interior cross section (that is, the inner wall) of the rib 34. Hence, when the rear portion of the main plate 33 is supportively engaged on the front top wall portion 45 of the rear sill 32, the front guide part 49 on each rib-end projection 47 projects a limited extent into the end of the respectively adjacent and aligned rib 34 to provide both proper alignment and interior support for the rib 34 adjacent the rear free edge 36. When so engaged, the rear free edge 36 of the main plate 33 is adapted to be disposed closely adjacent and substantially abut the elongate shoulder structure defined by shoulders 46 and 51. When thus assembled, then the pan 31 is fixedly secured to the rear sill member 32 by suitable spot welds, which spot welds preferably are provided not only at the valleys of the pan but also at the top of the ribs, such spot welds being indicated at 53 in FIG. 4. Any remaining crack or crevice between the rear free edge 36 of the main pan 31 and the shoulder formed on the rear sill member 32 will be filled with a suitable sealant or caulk.

As illustrated by FIGS. 5-7, the rib-end projections 47 are preferably hollow and open downwardly through the interior of the channel-like sill member 32, with these rib-end projections 47 being of thickness similar to and integrally and monolithically joined to the top wall 44-45. To achieve this desired structure, the channel member is preferably initially roll formed, and then subjected to a pressing or stamping operation which deforms the top wall so as to create the rib-end projections 47.

The front rail 38 and the intermediate rails 39 are also preferably roll formed, and each are of a generally upwardly-opening U-shaped or channel-shaped cross section. In fact, the three intermediate cross rails 39 are all preferably of identical cross sections, which cross section is generally hat-shaped in that it includes a generally upwardly-opening U-shaped cross section having generally horizontal top flanges which project outwardly in opposite directions from the upper edge of each leg, which top flanges directly engage the bottom surface of the pan 31 and are fixedly secured thereto, such as by spot welds. The three intermediate rails 39 are of identical cross section, with the only difference being in their lengths. The front cross rail 38 also has top flanges similar to the rails 39, but one of the top flanges also has an additional forwardly and downwardly projecting flange for securement to the front panel of the box.

The bed assembly of this invention utilizes and is constructed from the main floor pad 31, the rear sill 32, the front cross member 38 and the intermediate cross members 39, all of which are suitably fixedly secured, as by spot welding, and all of which are preferably formed primarily by roll forming. In addition, the bed assembly is completed by provision of secondary bed members 40 similar to the members 22 of FIG. 1, which members can be constructed in a conventional manner, such as by being stamped if desired, so as to define the regions of the bed positioned forwardly and rearwardly of the wheelwell housings. The rearmost secondary bed members 22 will also be dimensioned so as to engage the end portions of the rear sill 32, such as the portion designated 55 in FIG. 3, which portion is free of rib-end projections, so as to substantially abut against the shoulder 46 to hence permit spot welding to the front top wall portion 45. These secondary bed members 22 will typically have the ribs stamped therein so as to terminate short of the rear edge thereof, as illustrated by FIG. 1, whereby the portion 55 of the rear sill 32 need not be provided with rib-end projections 47. However, it will be understood that these secondary bed members 22 and the portions 55 of the rear sill 32 can be formed with ribs and rib-end projections in the same manner as the main pan 31 if desired, although such is believed unnecessary.

Figure 8:
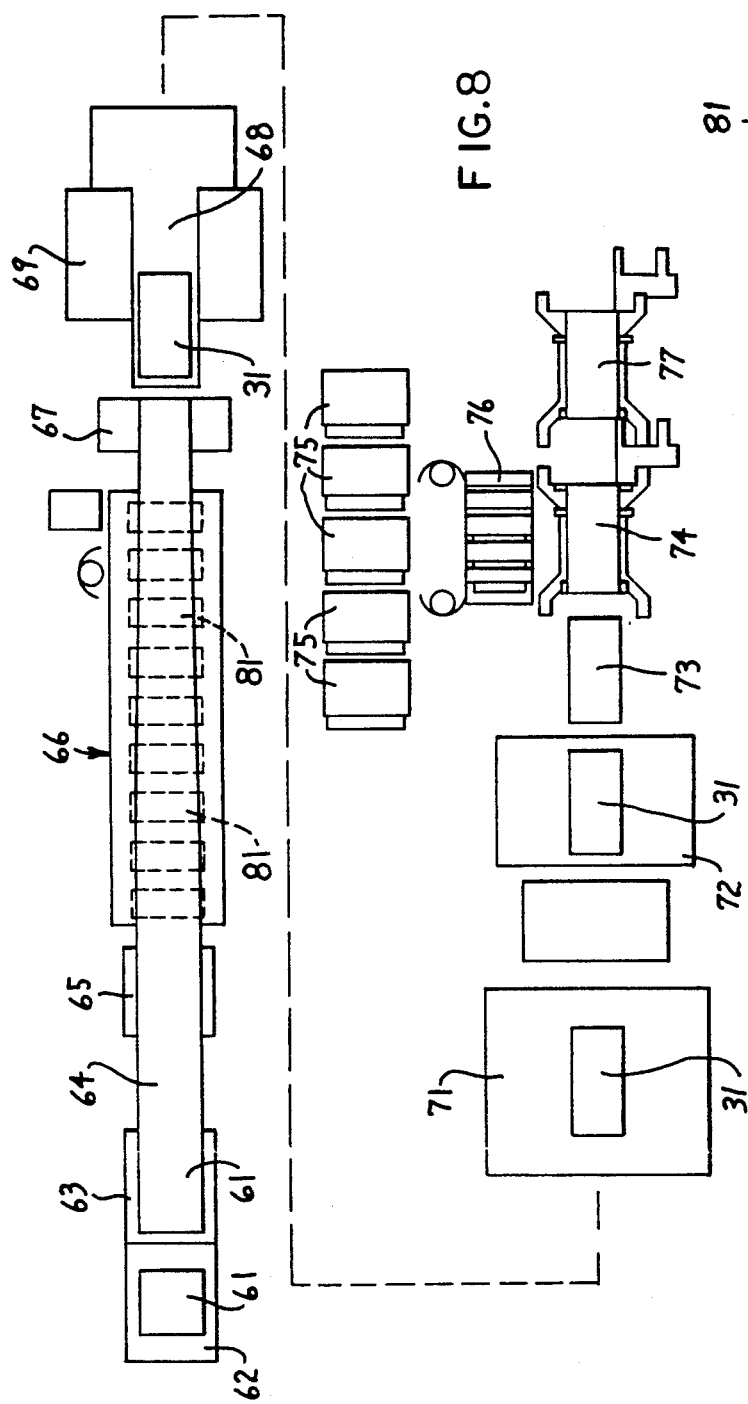
FIG. 8 is a flow diagram which diagrammatically illustrates the forming equipment and process utilized for roll forming of the main floor pan and the securement thereof to the cross rails.

Referencing now FIG. 8, there is diagrammatically illustrated a plan view of the apparatus and process for forming the bed assembly, specifically the main floor pan 31 and the securement thereof to the cross rails.

The main floor pan 31 is formed from thin steel sheet which during the forming process is a substantially continuous sheet supplied from a large coil. The width of the steel sheet is selected based on the desired finished dimensions of the formed floor pan 31 so as to permit creation of the corrugated floor pan including formation of the side edge flanges 37 thereon, whereby trimming of the sheet or finished pan, and hence creation of sheet material waste, is unnecessary. The initial width of the flat steel sheet, as provided in the coil, substantially corresponds to the width of the finished floor pan 31 if flattened out into a planar condition.

The steel sheet is normally supplied in the form of a large coil 61 as provided on a coil feed rack 62 which can be positioned adjacent a cradle 63 onto which the coil 62 can be transferred for support during the manufacturing operation. The cradle 63 has conventional structure associated therewith to effect straightening of the sheet material as it is discharged therefrom in the form of a substantially continuous sheet 64. The sheet material is fed through a combined end shear-welder which trims the leading and trailing ends of each coil and welds the trimmed trailing end of one coil to the leading trimmed end of the next coil so as to permit a substantially continuous sheet 64 to be feed into and through the subsequent manufacturing stations.

After passing through the shear/welder 65, the continuous steel sheet 64 progressively moves through a roll mill 66 which progressively reforms the steel sheet so that, while the steel sheet is substantially flat when entering the leading end of the roll mill 66, the steel sheet has been suitably formed so as to have the finished cross section of the floor pan 31 when leaving the discharged end of the mill 66. This progressive reforming of the steel sheet as it passes through the mill 66 is diagrammatically illustrated by the progressive decreasing width of the steel sheet as it moves longitudinally through the mill.

Figure 3:
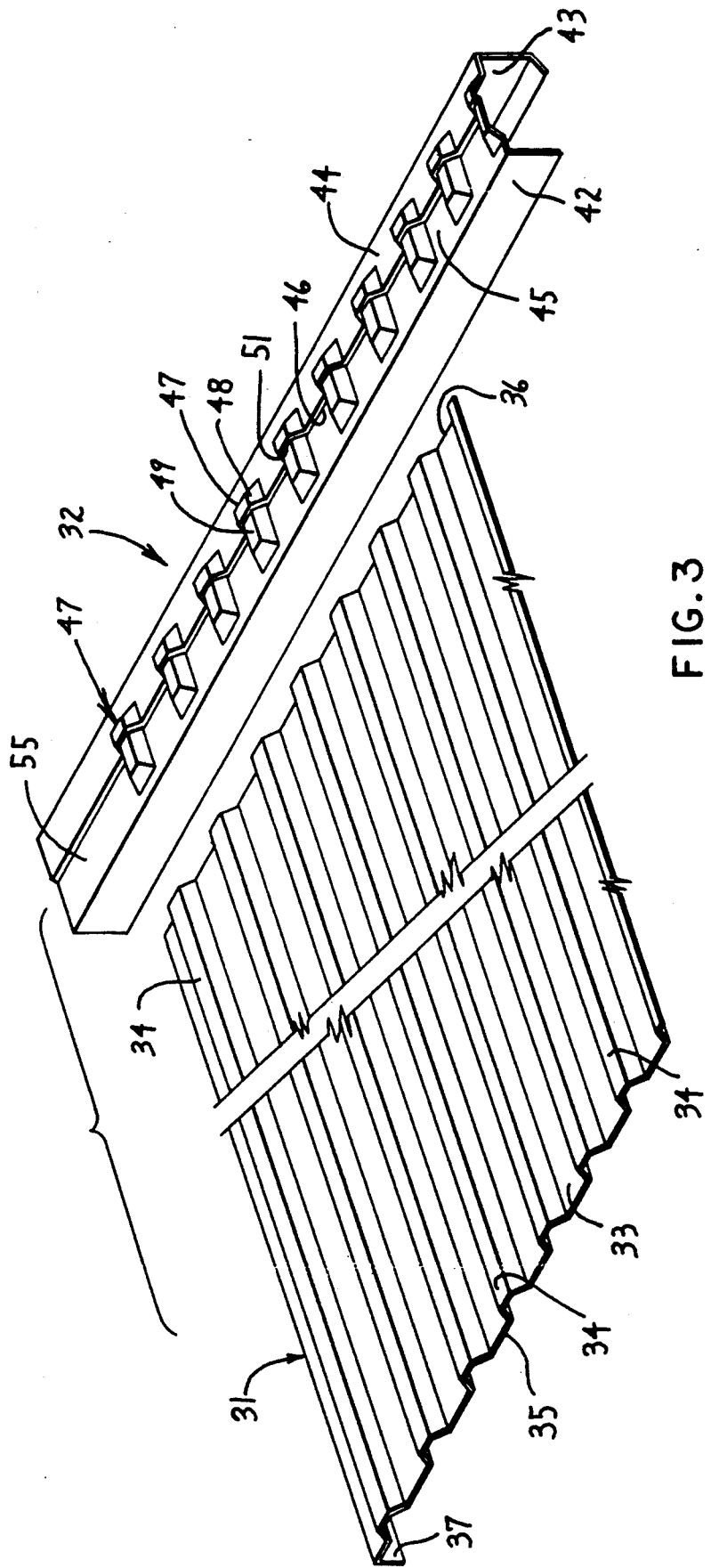
FIG. 3 is an enlarged, fragmentary perspective view which illustrates the structure of and cooperation between the main floor pan and rear sill according to the present invention.

Upon leaving the roll mill 66 the continuous steel sheet 64 has now been formed so as to have the corrugated cross section of the pan 31 substantially as illustrated by FIG. 3, and this continuous corrugated steel sheet is then feed into and through a cut-off press 67 which cuts the corrugated steel sheet at desired spaced distances corresponding to the desired lengths of the finished floor pan 31. The now separate floor pan 31 is then transferred to a conveyor 68 which passes the floor pan through an inspection station 69 which carries out the desired inspection process, much of which will be accomplished by laser inspection devices. The inspected floor pan 31 is then transferred to a press 71 which carries out secondary stamping operations on the floor pan. Such secondary stamping operations include the stamping of notches in the side edge flanges 37, and the stamping of bolt holes vertically through the floor pan, which bolt holes are used for subsequent securement of the bed assembly to the truck frame. The floor pan 31 is then transferred to a further inspection station 72 which carries out further inspection with respect to the stamping operations, this again normally involving laser inspection devices. A transfer device 73 then moves the finished floor pan 31 to an intermediate or tack welding station 74. This latter station is also supplied with the cross rails 32, 38 and 39, which rails in the illustrates embodiment are all individually supplied in separate containers or storage devices 75. In this respect, all of the cross rails are previously preformed, preferably on separate roll forming lines from separate steel coils. In this respect, each of the rails 32, 38 and 39 is preferably formed on its own roll forming line, which line operates in substantially the same manner as the roll forming line used for creating the main bed 31.

At the tack weld station 74, the five required sill members are removed from the containers 75 and positioned on a loading device 76 which supports the five sill members in the desired positional relationship. This device 76 then transfers the sill members into proper engagement with the floor pan 31 at the tack weld station 74. This tack weld device 74 is activated to create tack welds between the cross rails and the floor pan to join them together as a unitized assembly. This unitized assembly is then transferred to a finished weld station 76 which then completes all of the required spot welds between the floor pan 31 and the various cross rails 32, 38 and 39. Upon completion of the spot welding operation at the station 77, then the bed assembly consisting of the main floor pan 31 and the cross rails is completed and the assembly is discharged for subsequent storage, packaging or handling as desired.

Figure 9:
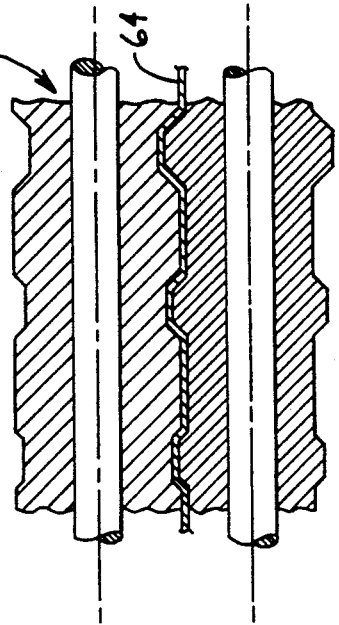
FIG. 9 is a fragmentary, sectional elevational view which diagrammatically illustrates some of the features associated with a typical roll forming station, such roll forming station being generally conventional.

With respect to the roll mill 66, it comprises a rather large number of conventional roll forming stations 81 disposed in adjacent but spaced relationship longitudinally throughout the length of the mill. Each roll forming station 81, as is conventional and is only diagrammatically illustrated in FIG. 9, includes opposed upper and lower roller assemblies which are rotatably driven and closely cooperatively engage the continuous steel sheet 64 therebetween as the steel sheet moves longitudinally through the mill. These opposed upper and lower rollers have suitable cooperating grooves and ribs defined on the peripheries thereof for suitably deforming the steel sheet to create formation of the ribs 34 therein. The roller stations 81 also have suitable edge rollers which effect formation of the side edge flanges 37.

As is known in the roll forming industry, the upstream stations 81 will initially effect greater formation of the ribs 34 which are disposed in the middle of the pan, and less formation of the ribs 34 which are spaced more closely adjacent the side edges of the pan, whereby this enables the sheet material to effectively contract inwardly as the ribs are formed without causing any significant reduction in sheet material thickness. Thus, the ribs which are located more centrally of the pan will be more completely formed at a location which is upstream of the mill from the location where the outermost ribs are more completely formed. The construction and operation of the roll mill, and particularly the use of numerous serially-arranged rolling stations to permit progressive formation both longitudinally and transversely of the workpiece, is well known in the roll forming industry so that further detailed description thereof is believed unnecessary.

Accordingly, by providing the main floor pan with stiffening ribs 34 which extend continuously throughout the full longitudinal length of the floor pan so that the ribs terminate at the front and rear free edges of the floor pan, the improved floor pan 31 can be constructed using roll forming techniques. This enables the pan to be formed from thin steel sheet with the finished pan having a high degree of thickness uniformity across the entire cross section thereof, including at the ribs and at the bent corners. The roll forming process also permits the steel sheet to be of higher strength without encountering cracking or similar problems, and the roll forming also permits the ribs to be formed with a higher degree of accuracy and consistency, so that the finished product has an improved appearance. This enables the pan to be formed from a thinner steel sheet, such as in the order of about 0.8 mm, and accordingly results in the floor pan being of significantly less weight.

By roll forming the floor pan, this also permits manufacturing economies and additional material economies since the floor pan can be longitudinally roll formed as a continuous strip, with the strip being cut into predetermined lengths after the cross section of the pan has been suitably roll formed.

In contrast, in the conventional technique wherein large precut sheets are individually stamped, the necessity of precutting the sheets prior to stamping necessarily requires additional handling steps. Further, the press must necessarily by of both large size and high capacity in order to permit stamping of the large piece. The cold flow and the thinning of the material which occurs during this stamping operation also necessarily dictates the use of low strength steel so as to avoid cracking, and hence in turn requires the use of thicker steel sheet, such as typically in the order of the 1.2 mm, in order to provide the desired strength. This has the obvious undesirable effect of increasing the weight of the finished product. Further, the undesired thickness reductions which occur in the cold stamping operation also create undesired wall variations which not only effect the structural integrity of the part, but also create visual inconsistencies which detract from the appearance of the part. Hence, this conventional constructional and manufacturing process have not only resulted in a product which is believed inferior to the product produced by the present invention, but have also involved manufacturing costs which are believed to be reduced by the improved process of this invention.

In an actual embodiment of the invention, the finished floor pan 31 may have a width of about 48 inches, and the flat steel sheet used for forming the pan will normally have a width, prior to initiation of the roll forming process, about 4 to 6 inches greater than the finished pan width.

While the invention described above contemplates use of the roll formed main pan 31 in conjunction with separately formed secondary pans 22, it will be appreciated that this invention also contemplates roll forming of the main and secondary pans as an integral one-piece member which, after completion of the roll forming, will be subsequently processed so as to create wheel-well openings in opposite sides portions thereof.

The present invention also contemplates and permits the floor pan to be rolled formed from laminated sheet material such as steel sheet having a plastic sheet layer laminated over the top thereof. Such construction may eliminate the need for a separate bed liner.

While the invention has been described for use on a pickup truck, it will be appreciated that this improved bed construction can also be used on other vehicles, particularly vans.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vehicle bed assembly having a horizontally-enlarged one-piece monolithic floor pan member constructed from a thin metal sheet and having a plurality of generally parallel and sidewardly-spaced stiffening ribs extending longitudinally thereof, said stiffening ribs being of generally downwardly-opening channel-like cross sections which are deformed so as to project upwardly from the sheet, and a horizontally elongated sill member having a top wall positioned at least partially under and fixedly secured to a transversely extending rear portion of said pan member, said rear sill member being elongated in a direction generally perpendicularly with respect to the longitudinal direction of said pan member, comprising the improvement wherein said stiffening ribs project longitudinally throughout the entire length of said pan member so as to terminate at front and rear free edges of said pan member, said front and rear free edges of said pan member each having a corrugated configuration, said rear sill member having a plurality of rib-end projections projecting upwardly from the top wall thereof, said rib-end projections being disposed in a row extending in the elongated direction of the rear sill member and spaced apart at intervals corresponding to the spacing between adjacent ribs on said floor pan member, the transversely extending rear portion of said floor pan member being positioned on the top wall of said rear sill member so that rear free edges of said ribs align with and substantially abut the respective rib-end projections on the sill member for closing off said ribs.

2. A vehicle bed assembly according to claim 1, wherein each said rib-end projection includes a rear rib part which is fixedly and integrally joined to a front guide part, said rear rib part projecting upwardly from said top wall and substantially abutting the rear free edge of the respective rib on the pan member for closing the end of the rib and constituting an extension of the rib, the respective front guide part projecting interiorly into the respective rib through a small longitudinal extent.

3. A vehicle bed assembly according to claim 2, wherein the top wall of the rib, in the vicinity of the rear free edge thereof, and the respective front guide part are directly spot welded together.

4. A vehicle bed assembly according to claim 2, wherein the rib-end projection is stamped from the top wall of said rear sill member.

5. A vehicle bed assembly according to claim 2, wherein said front guide part has an exterior size and cross sectional configuration which substantially corresponds to the interior size and cross sectional configuration of the respective rib in the vicinity of the rear free edge thereof.

6. A vehicle bed assembly according to claim 1, wherein the top wall of the rear sill member is provided with front and rear top wall portions which are slightly vertically offset from one another and are joined together by a shoulder, said front wall portion being vertically displaced downwardly from the rear top wall portion so that said shoulder faces forwardly and is adapted to substantially abut the rear free edge of said pan member.

7. A vehicle bed assembly according to claim 6, wherein said rear sill member is roll formed in the elongate direction thereof.

8. A vehicle bed assembly according to claim 6, wherein said rib-end projection includes a rib-defining end part which projects upwardly from said rear top wall portion and which defines thereon a generally forwardly-facing edge surface which aligns with and substantially abuts the rear free edge of the respective rib.

9. A vehicle bed assembly according to claim 8, wherein each rib-end projection includes a front guide part which projects upwardly from the front top wall portion and is integrally joined to and projects forwardly from the respective rib-defining end part, said front guide part being positioned to nest interiorly within and substantially engage the inner surface of the respective rib throughout a small longitudinal extent thereof adjacent the rear free edge thereof.

10. A vehicle bed assembly according to claim 9, wherein said front top wall portion is vertically offset downwardly relative to said rear top wall portion by a distance which is of similar magnitude to the thickness of the metal sheet defining said pan member.

11. A vehicle bed assembly according to claim 9, wherein said rib-end projections are stamped from said top wall and have hollow interiors which open downwardly, and said pan member being fixedly secured to said rear sill member by a plurality of spot welds which are disposed adjacent said rear free edge, said plurality of spot welds including a first series of spot welds which cooperate directly between the front top wall portion and said metal sheet at regions thereof defined between said ribs, and a second series of spot welds which cooperate directly between top walls of said ribs and the underlying respective front guide parts.

12. A process for forming a unitized bed assembly for a vehicle such as a pickup truck, comprising the steps of:
providing a wide and horizontally elongated flat sheet of thin metal;
forming said flat metal sheet to define a plurality of generally parallel, sidewardly-spaced, channel-like stiffening ribs therein with said stiffening ribs extending longitudinally throughout the entire length of the formed metal sheet so as to terminate at and define corrugated front and rear free edges on the formed sheet;
providing an elongate rear sill member having a generally flat top wall provided with a plurality of rib-end defining projections projecting upwardly from said top wall at intervals spaced therealong corresponding to the spacing between the ribs in said formed sheet;
then positioning said formed sheet so that a rear portion thereof, directly adjacent the rear free edge, is positioned directly over and supportingly engaged with said top wall so that said rib-end defining projections are aligned directly adjacent and close off rear free ends of the ribs on said formed sheet; and
then fixedly securing said formed sheet to said rear sill member.

13. A process according to claim 12, wherein the forming of the flat metal sheet occurs by moving the flat metal sheet through a roll forming mill which causes the plurality of stiffening ribs to be roll formed into the sheet throughout the entire longitudinal length thereof without causing any significant reduction in the thickness of the sheet material.

14. A process according to claim 13, wherein the formed sheet and rear sill member are fixedly secured by a series of spot welds which connect between the top wall of the rear sill member and the rear portion of the formed sheet at regions thereof located between adjacent ribs.

15. A process according to claim 13, wherein the rib-end defining projections on said rear sill member are provided with a rear rib-end part which at a forward end thereof has a configuration which substantially corresponds to and substantially abuts the adjacent free end of the respective rib and which slopes rearwardly and downwardly for merger with the top wall, and the rib-end defining projection also being provided with a front guide part which projects upwardly from the top wall and forwardly from the rear rib end part and which projects longitudinally into the interior of the adjacent rib.

16. A process for forming a unitized vehicle bed assembly, such as for a pickup truck, comprising the steps of:

providing a generally horizontally elongate rolling mill having a plurality of sequentially positioned rolling stations each defining opposed upper and lower rolls which cooperate to define therebetween a series of cooperating annular peripheral ribs and grooves;

providing a horizontally wide and substantially continuous and horizontally elongate flat sheet of thin metal;

feeding said substantially continuous and horizontally elongate flat sheet of thin metal into and through said rolling mill to effect roll forming of a plurality of generally parallel, sidewardly-spaced, channel-like stiffening ribs therein to create a substantially continuous formed sheet having said stiffening ribs extending longitudinally throughout the entire length thereof as said formed sheet discharges from the rolling mill;

thereafter severing the continuous formed sheet into formed sheet members of predetermined longitudinal length having said stiffening ribs extending longitudinally throughout the entire length thereof so that the formed sheet member has corrugated front and rear free edges thereon;

forming a rear sill member which is longitudinally elongated and has a generally flat wall which is elongated and has a length which at least substantially equals the width of the formed sheet member;

providing the flat wall of said rear sill member with a plurality of rib-end projections projecting upwardly therefrom at intervals spaced therealong corresponding to the spacing between the ribs in said formed sheet member;

positioning the elongate rear sill member transversely relative to and closely adjacent the rear free edge of said formed sheet member so that the rib-end projections on said rear sill member are aligned directly adjacent and substantially close off rear free ends of the ribs on said formed sheet member; and fixedly securing said formed sheet member to said rear sill member.

17. A process according to claim 16, wherein the flat wall of said sill member is provided with front and rear flat wall portions which are closely adjacent and extend in the elongate direction of the sill member with said front wall portion being spaced vertically downwardly a small distance from the rear wall portion and joined thereto by a frontwardly-facing shoulder, said rib-end projections projecting upwardly from said rear wall portion and defining thereon forwardly-facing channel-shaped shoulders.which are substantially vertically aligned with said first-mentioned shoulder and are adapted to substantially abut the adjacent free end of the respective rib.

18. A process according to claim 16, including the step of roll forming downwardly-projecting side flanges along each longitudinally-extending side edge of said formed sheet member as the metal sheet is moved through the roll forming mill.

19. A process according to claim 18, wherein the flat sheet as supplied to the roll forming mill has a width which is about four to about six inches greater than the transverse horizontal width of the formed metal sheet upon discharge from the roll forming mill, whereby further longitudinal severing of the longitudinal edges of the formed sheet member is not required.

20. A process according to claim 19, including the steps of roll forming a plurality of cross support rails of a generally upwardly-opening hat-shaped cross section, positioning a plurality of said cross rails in perpendicularly extending relationship beneath the formed sheet member in longitudinally spaced relationship from the rear free edge of the sheet member, and thereafter fixedly securing said formed sheet member to said cross rails.

* * * * *